(12) United States Patent
Li et al.

(10) Patent No.: US 10,486,143 B2
(45) Date of Patent: Nov. 26, 2019

(54) MIXED-CONDUCTOR ENHANCED COMPOSITE AND CORE-SHELL OXIDES FOR CYCLIC REDOX PRODUCTION OF FUELS AND CHEMICALS

(71) Applicant: North Carolina State University, Raleigh, NC (US)

(72) Inventors: Fanxing Li, Raleigh, NC (US); Yanguang Chen, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 15/109,894

(22) PCT Filed: Jan. 6, 2015

(86) PCT No.: PCT/US2015/010280
§ 371 (c)(1),
(2) Date: Jul. 6, 2016

(87) PCT Pub. No.: WO2015/103591
PCT Pub. Date: Jul. 9, 2015

(65) Prior Publication Data
US 2016/0332151 A1   Nov. 17, 2016

Related U.S. Application Data

(60) Provisional application No. 61/923,939, filed on Jan. 6, 2014.

(51) Int. Cl.
*B01J 23/94* (2006.01)
*B01J 23/83* (2006.01)
(Continued)

(52) U.S. Cl.
CPC ............. *B01J 23/94* (2013.01); *B01J 23/002* (2013.01); *B01J 23/005* (2013.01); *B01J 23/745* (2013.01);
(Continued)

(58) Field of Classification Search
CPC ....................................................... B01J 23/94
See application file for complete search history.

(56) References Cited

U.S. PATENT DOCUMENTS

2007/0281160 A1* 12/2007 Krishna ................. B01D 69/02
428/403
2014/0023939 A1* 1/2014 Chen ................... H01M 4/9016
429/405

FOREIGN PATENT DOCUMENTS

EP         2640509 A2      9/2013
WO   WO 2012/100354    *   8/2012

OTHER PUBLICATIONS

Partial Oxidation of Methane to Syngas Using Lattice Oxygen of La(1-x)Sr(x)FeO3 Perovskite Oxide Catalysts Instead of Molecular Oxygen. Ranjia Li J. of Nat. Gas Chem. V.11, pp. 137-144 (Year: 2002).*

(Continued)

*Primary Examiner* — Douglas B Call
(74) *Attorney, Agent, or Firm* — Thomas|Horstemeyer, LLP

(57) ABSTRACT

Compositions and methods for preparing and using ceramic mixed ionic-electronic conductor (MIEC) enhanced transition metals and metal oxides in composite or core-shell forms are disclosed. The presently disclosed compositions are stable at high temperatures and can carry as much as about 20 weight % oxygen.

9 Claims, 14 Drawing Sheets

(51) Int. Cl.
*C01B 3/40* (2006.01)
*B01J 23/745* (2006.01)
*B01J 35/00* (2006.01)
*B01J 38/48* (2006.01)
*B01J 23/00* (2006.01)
*B01J 23/78* (2006.01)

(52) U.S. Cl.
CPC ............ *B01J 23/78* (2013.01); *B01J 23/83* (2013.01); *B01J 35/0006* (2013.01); *B01J 38/48* (2013.01); *C01B 3/40* (2013.01); *B01J 2523/00* (2013.01); *C01B 2203/0261* (2013.01); *C01B 2203/1047* (2013.01); *C01B 2203/1082* (2013.01); *C01B 2203/1241* (2013.01)

(56) References Cited

OTHER PUBLICATIONS

Partial Oxidation of Methane to Syngas Using Lattice Oxygen of La1-xSrxFeO3 Perovskite Oxide Catalysts instead of Molecular Oxygen Ranjia Li et al. J. of Natural Gas Chemistry vol. 11, pp. 137-144 (Year: 2002).*

International Search Report for PCT/US2015/010280 dated May 14, 2015.

Shafiefarhood, A. et al.: "Core-Shell Redox Catalyst for Chemical Looping Reforming of Methane", AICHE, 2013 Annual Meeting, Particle Technology Forum, May 11, 2013 (May 11, 2013).

Khine, M.S.S. et al.: "Syngas production by catalytic partial oxidation of methane over (La0.7A0.3)BO3(A=Ba, Ca, Mg, Sr, and B=Cr or Fe) perovskite oxides for portable fuel cell applications", International Journal of Hydrogen Energy, vol. 38, Aug. 22, 2013 (Aug. 22, 2013), pp. 13300-13308, XP028717631, DOI: doi:10. 1016/ijhydene.2013.07.097.

Galinsky, N. L. et al.: "Iron Oxide with Facilitated O2—Transport for Facile Fuel Oxidation and CO2 Capture in a Chemical Looping Scheme", ACS Sustainable Chem. Eng. 2013, vol. 1, Feb. 2, 2013 (Feb. 2, 2013), pp. 364-373.

Mims, C. A. et al.: "Modes of surface exchange in La0.2Sr0.8Cr0.2Fe0.8O3-d", Solid State Ionics, vol. 176, Jan. 2005 (Jan. 1, 2005), pp. 319-323, XP027742728.

Wei, L. et al.: "Synthesis of Diphenyl Carbonate over the Magnetic Catalysts Pd/La1-xPbxMnO3(x=0.2-0.7", Chin. J. Chem. Eng., vol. 21, No. 1, Jan. 2013 (Jan. 1, 2013).

* cited by examiner

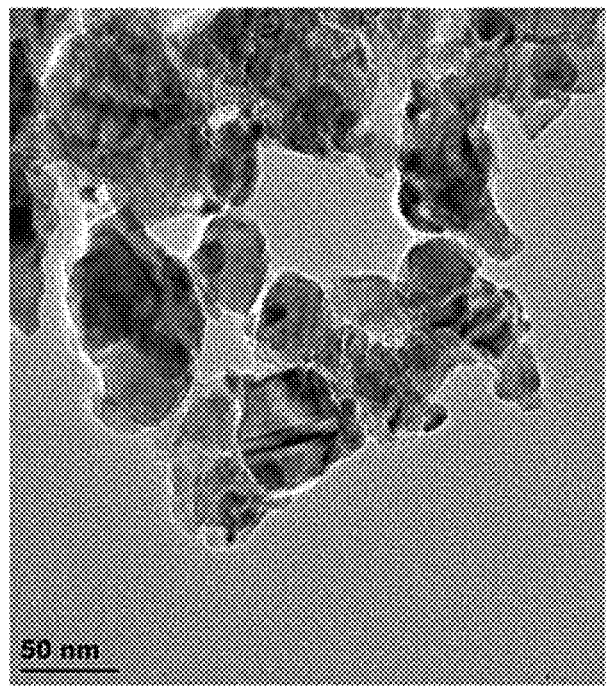
FIG. 9A
FIG. 9B
FIG. 9C
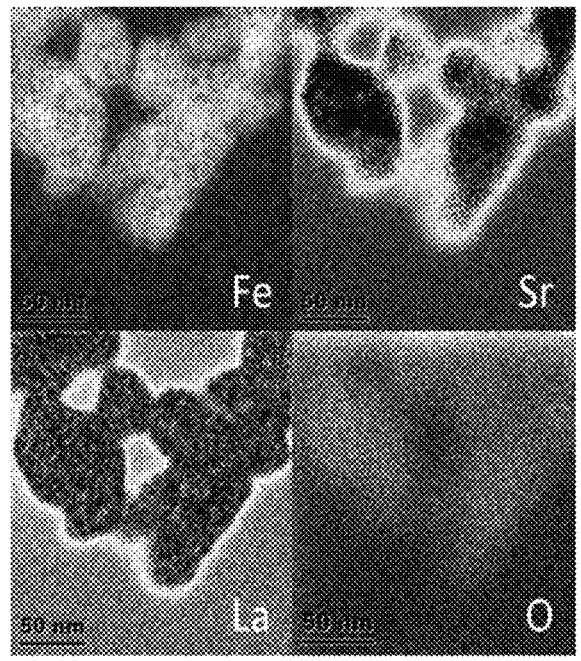
FIG. 9D
FIG. 9E

MIXED-CONDUCTOR ENHANCED COMPOSITE AND CORE-SHELL OXIDES FOR CYCLIC REDOX PRODUCTION OF FUELS AND CHEMICALS

CROSS-REFERENCE TO RELATED APPLICATIONS

This application is the 35 U.S.C. § 371 national stage application of PCT Application No. PCT/US2015/010280, filed Jan. 6, 2015, which claims the benefit of U.S. Provisional Application No. 61/923,939, filed Jan. 6, 2014, both of which are incorporated herein by reference in their entirety.

FEDERALLY SPONSORED RESEARCH OR DEVELOPMENT

This invention was made with Government support under grant number 1254351 awarded by the National Science Foundation. The Government has certain rights in this invention.

BACKGROUND

Chemical looping combustion (CLC) and chemical looping gasification (CLG) represent promising technologies for capturing carbon dioxide ($CO_2$) emissions from fossil fuels with reduced energy penalty. These processes utilize the transfer of oxygen from air and/or water to the fuel through cyclic redox operations of solid oxygen carriers. Similar cyclic redox processes include the steam-iron process, solar-thermal water-splitting processes, and a number of redox catalyst-based selective oxidation processes, e.g., the DuPont redox maleic anhydride production process.

An important aspect of these cyclic redox processes is the selection of oxygen carrier (or redox catalyst) materials with adequate reactivity. Oxides of transition metals (e.g., Mn, Fe, Co, Ni, V, Mo, and Cu), their mixtures, and natural minerals have been used as oxygen carriers in CLC. High reactivity during redox reactions over a long term and the ability to fully or partially convert the fuel are sought-after characteristics. In addition, thermal stability, mechanical strength, and resistance to agglomeration also are important. Two methods for achieving the desired characteristics of stability, strength, reactivity, and selectivity are known. One method is to mix the oxygen carrier with an inert support, such as $TiO_2$, $SiO_2$, $ZrO_2$, $Al_2O_3$ or $MgAl_2O_4$, followed with thermal treatment.

To date, however, an effective strategy to design oxygen carrier/redox catalysts with optimum performance in terms of stability, strength, reactivity, and selectivity is still lacking.

SUMMARY

In some aspects, the presently disclosed subject matter provides a redox catalyst comprising an oxygen carrying material, a mixed ionic-electronic conductive (MIEC) support, and a catalytically-active surface.

In other aspects, the presently disclosed subject matter provides a core-shell redox catalyst comprising: (i) metal oxide core; (ii) a mixed ionic-electronic conductive (MIEC) shell; and (iii) a plurality of surface catalytic sites.

In yet other aspects, the presently disclosed subject matter provides a redox catalyst comprising a mixed ionic-electronic conductive (MIEC) oxide that acts both as an oxygen carrying material and a catalyst.

In particular aspects, the presently disclosed oxides can be generally used for cyclic redox conversion of commodity fuels, such as natural gas, coal, biomass, and the like, into value-added, environmentally friendly products, such as hydrogen, synthesis gas, electricity, and other chemicals or fuels.

Certain aspects of the presently disclosed subject matter having been stated hereinabove, which are addressed in whole or in part by the presently disclosed subject matter, other aspects will become evident as the description proceeds when taken in connection with the accompanying Examples and Figures as best described herein below.

BRIEF DESCRIPTION OF THE FIGURES

Figure 1A:
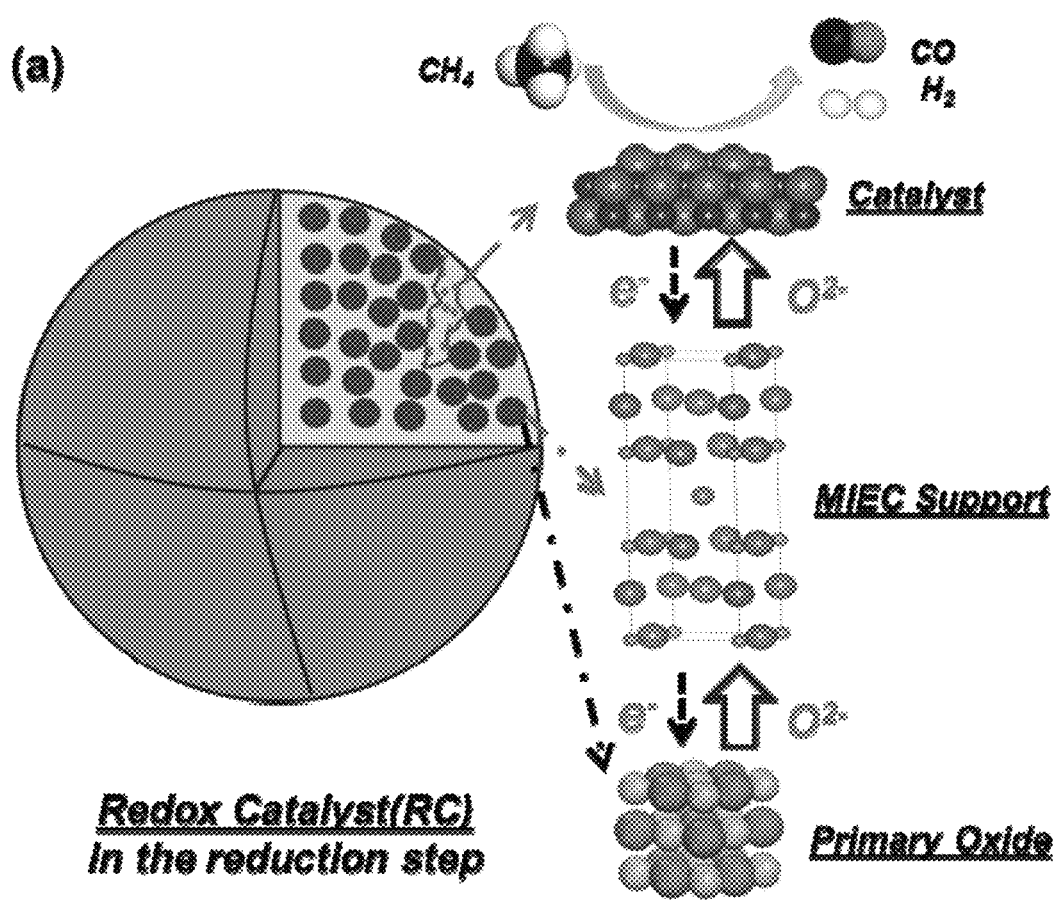
Figure 1B:
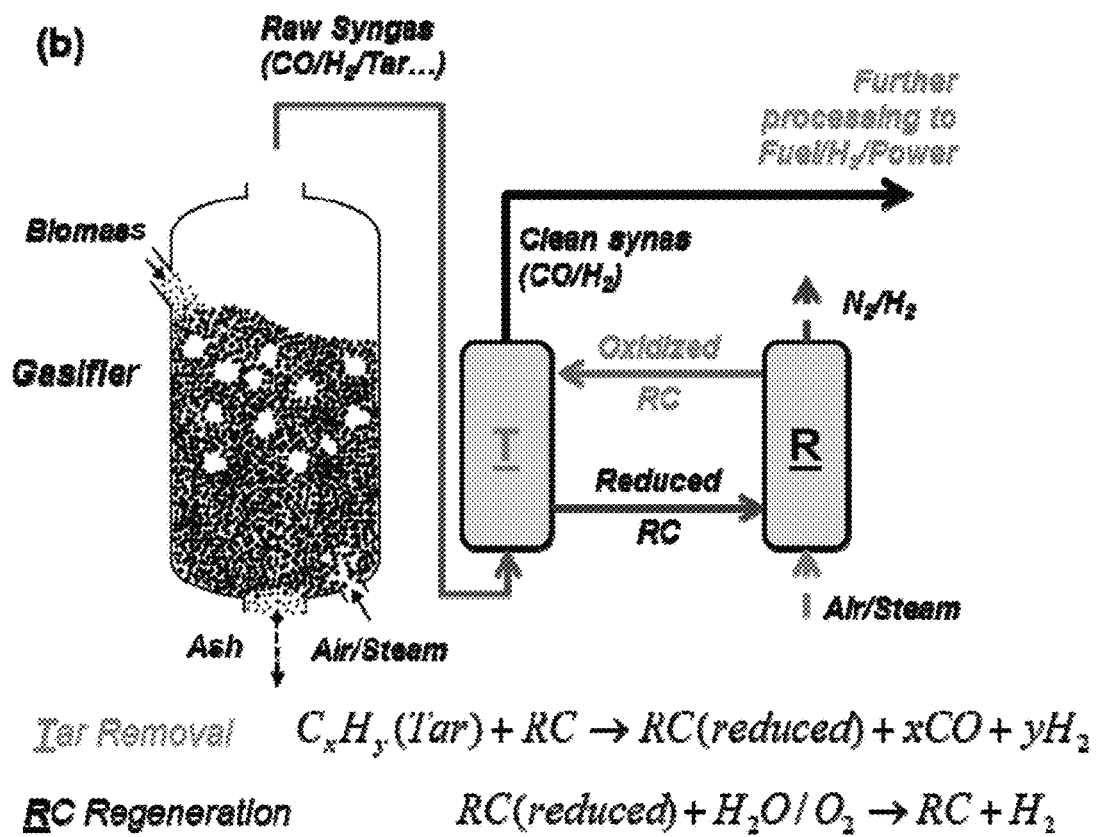
Figure 2A:
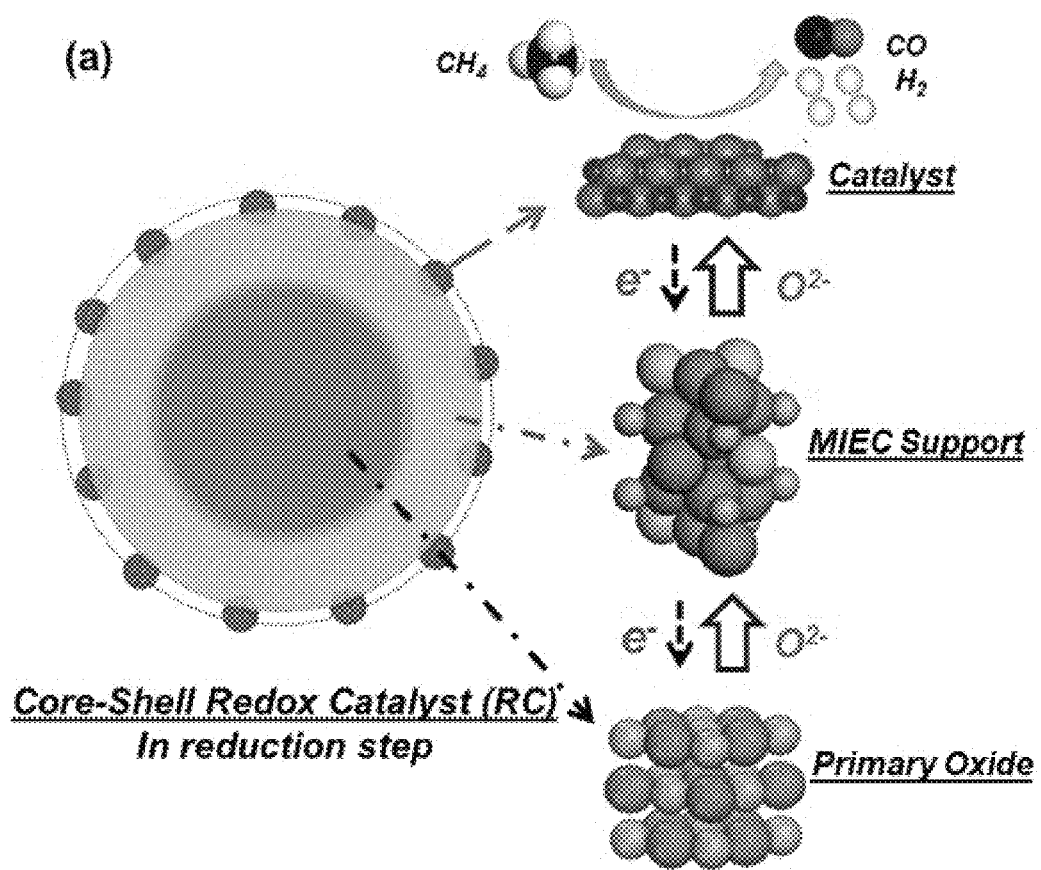
Figure 2B:
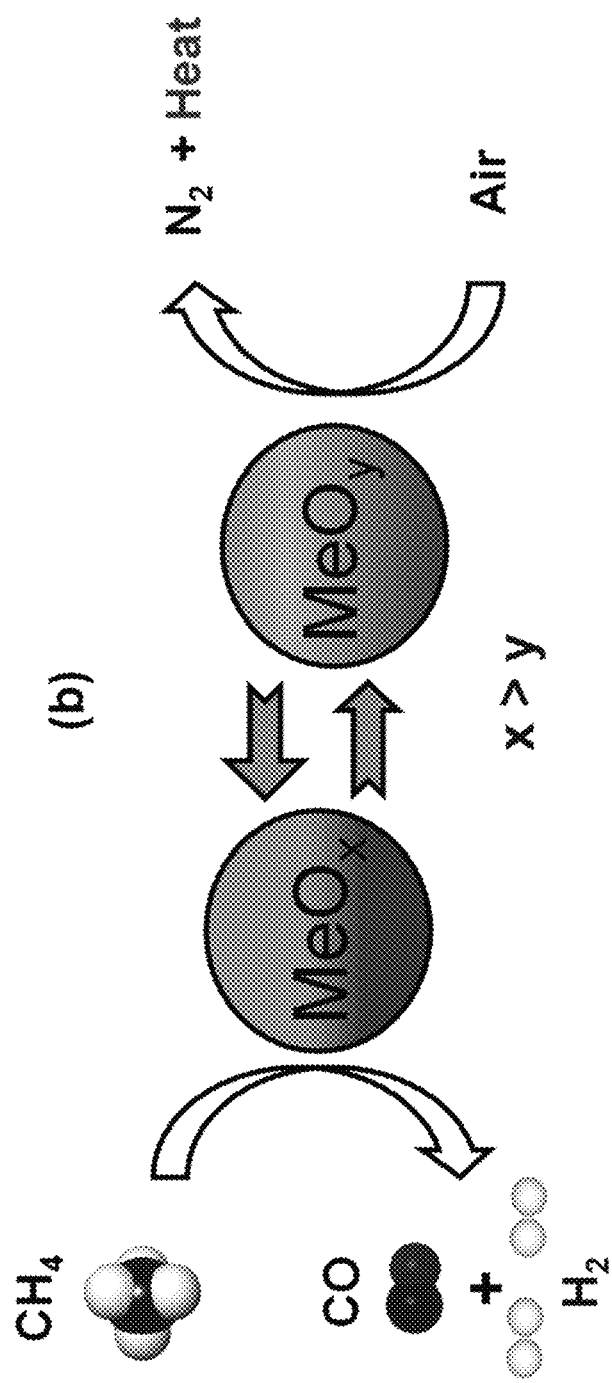
Figure 3:
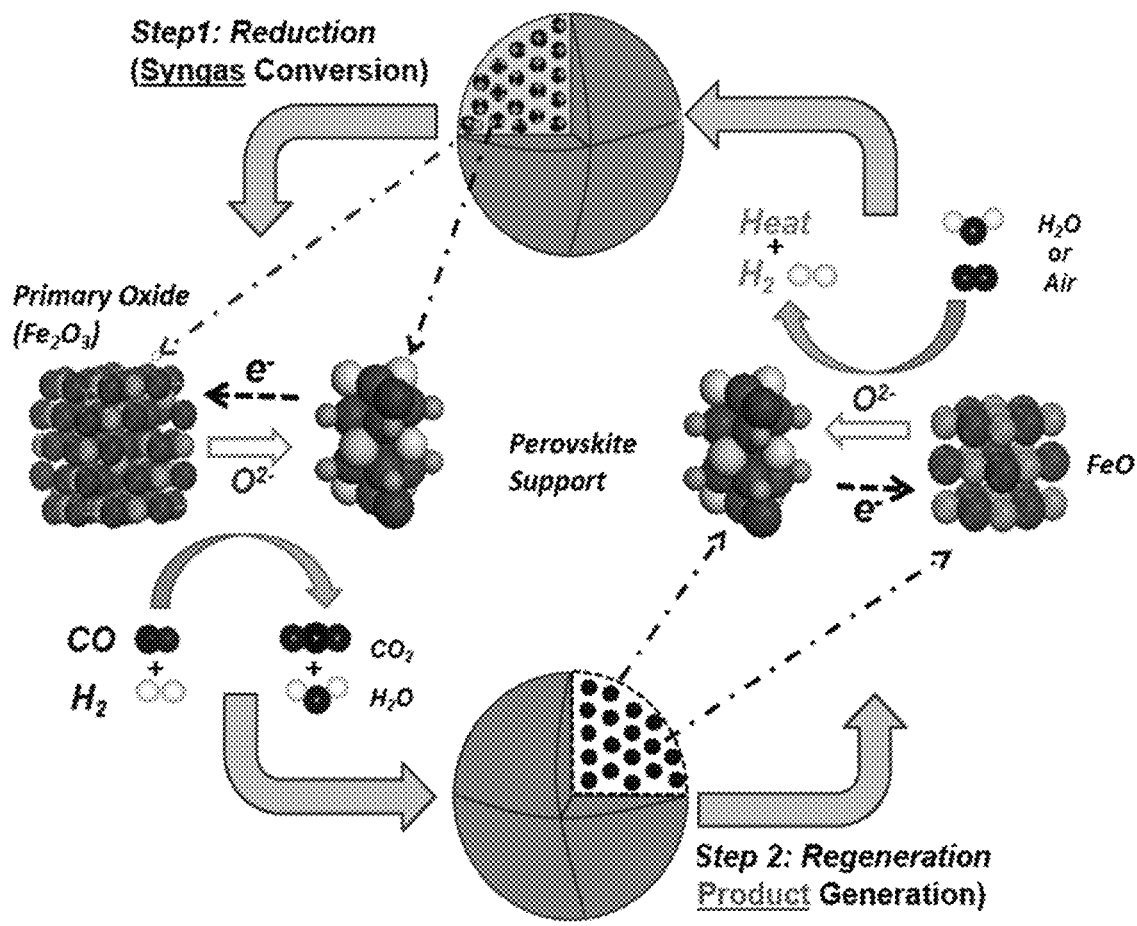
Figure 4:
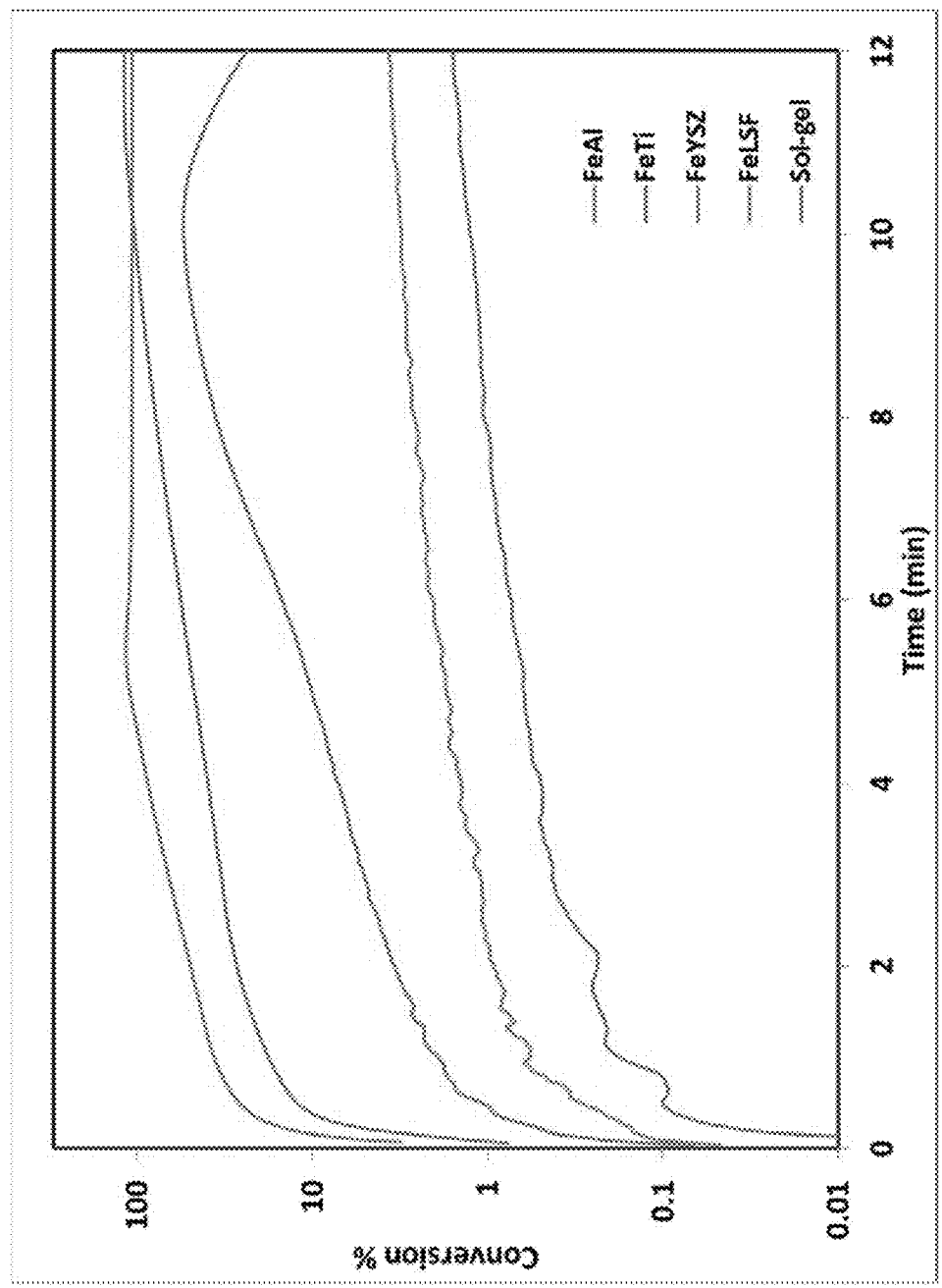
Figure 5:
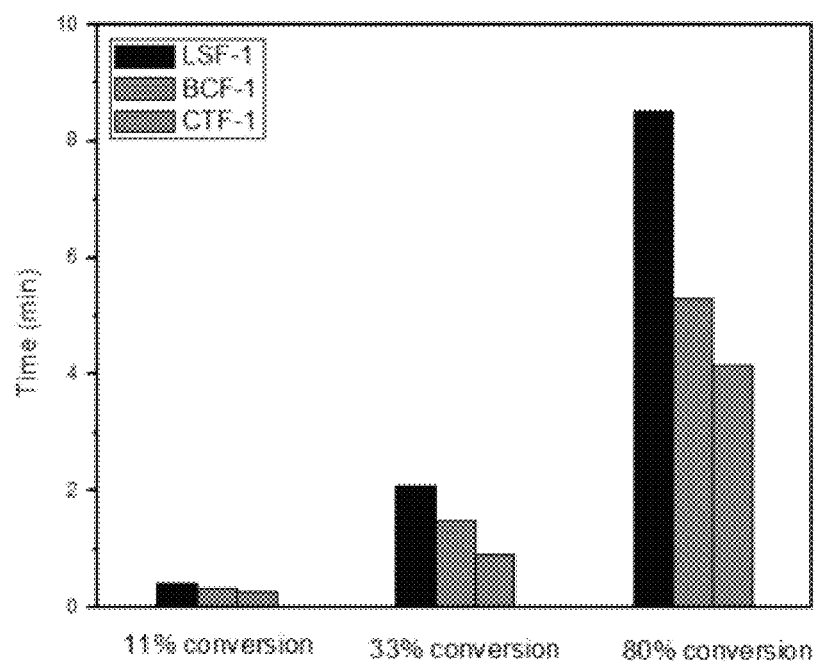
Figure 6A:
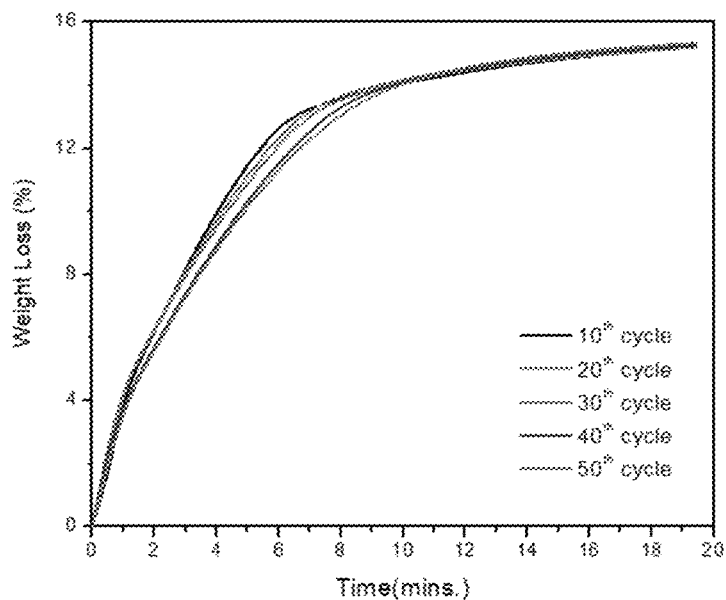
Figure 6B:
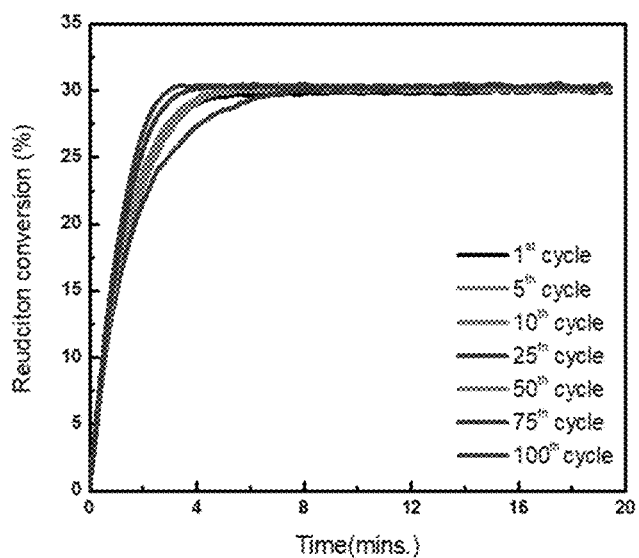
Figure 6C:
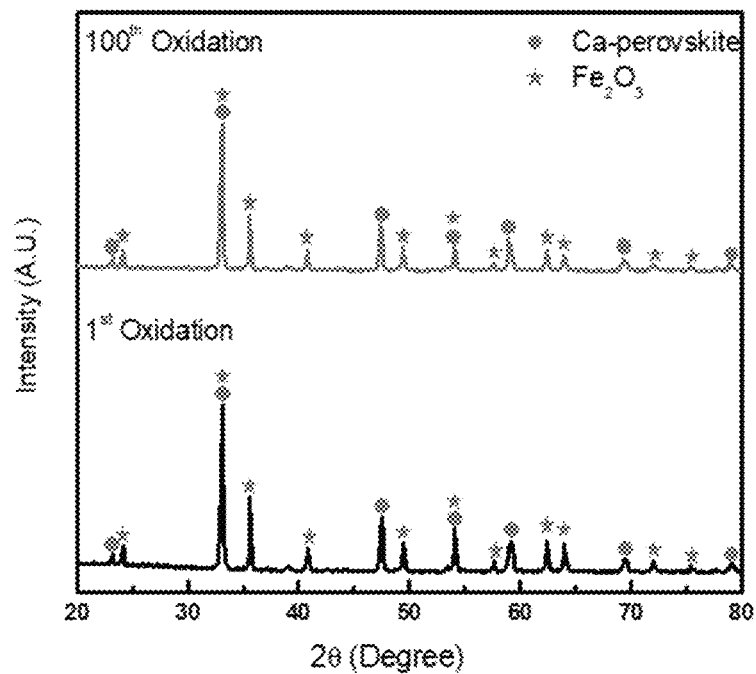
Figure 7A:
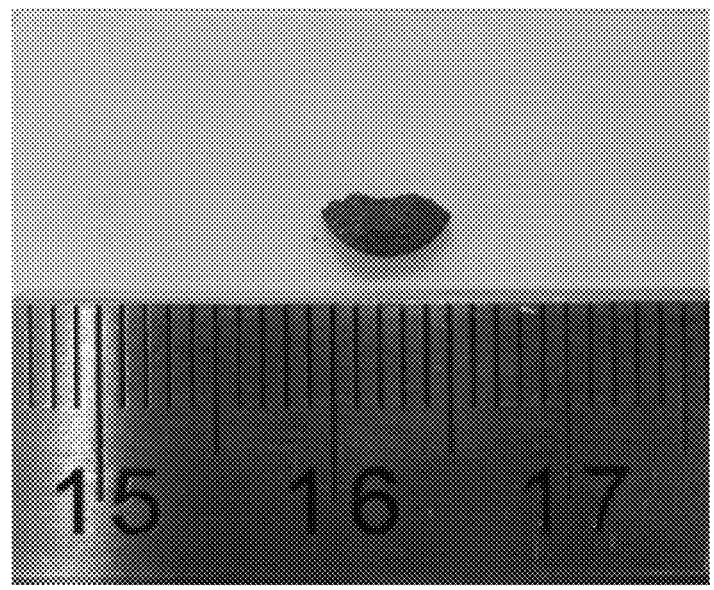
Figure 7B:
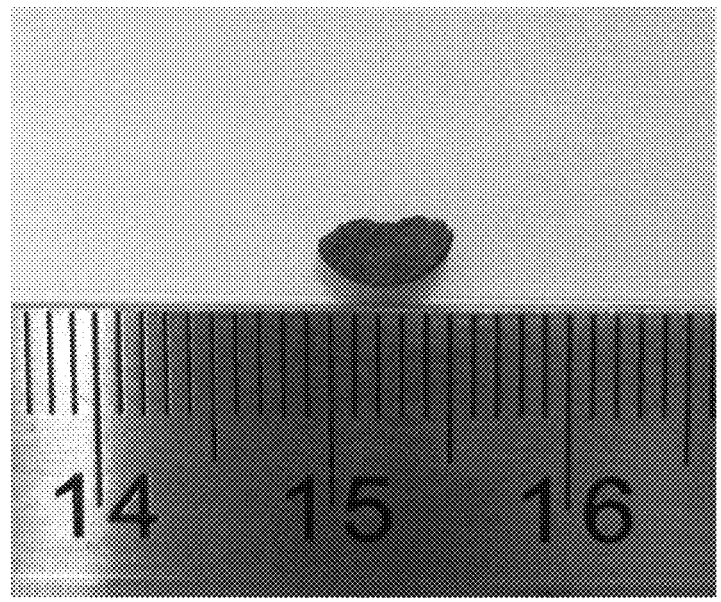
Figure 7C:
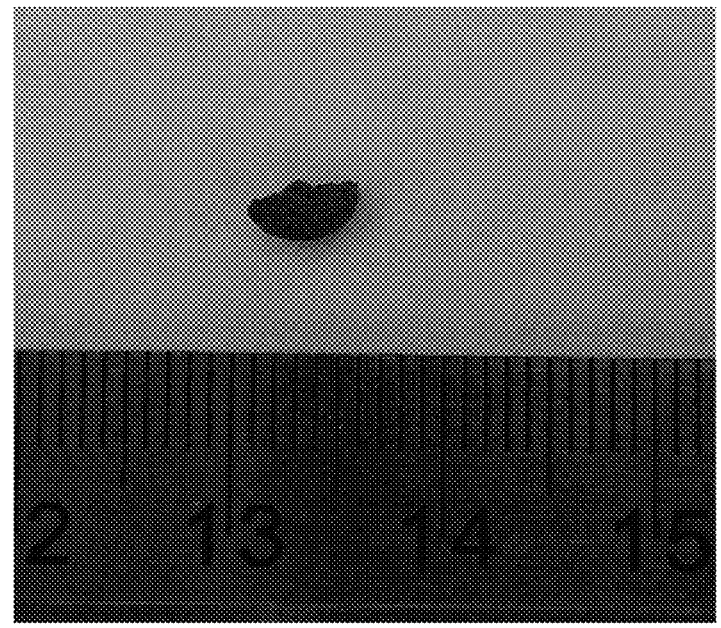
Figure 8A:
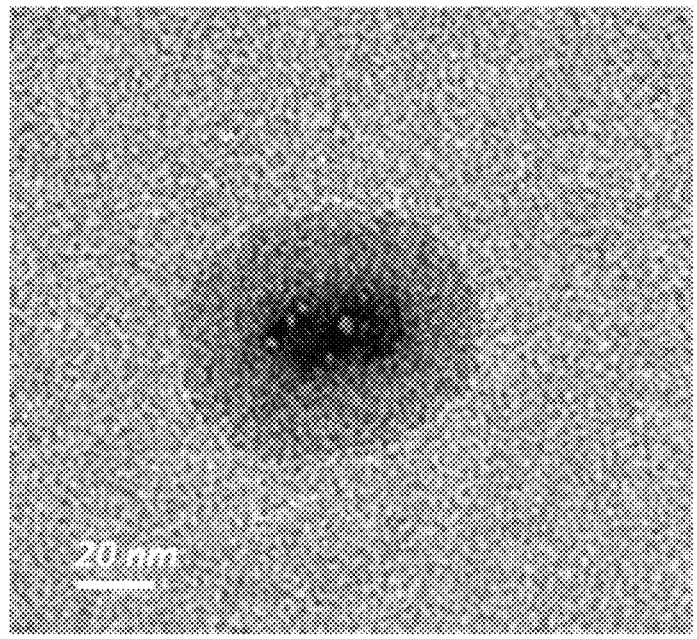
Figure 8B:
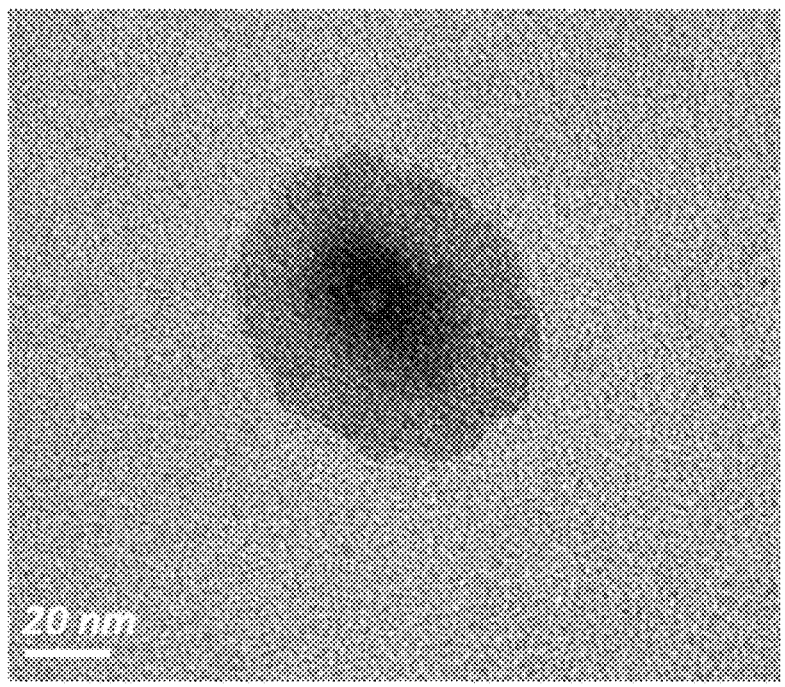
Figure 10A:
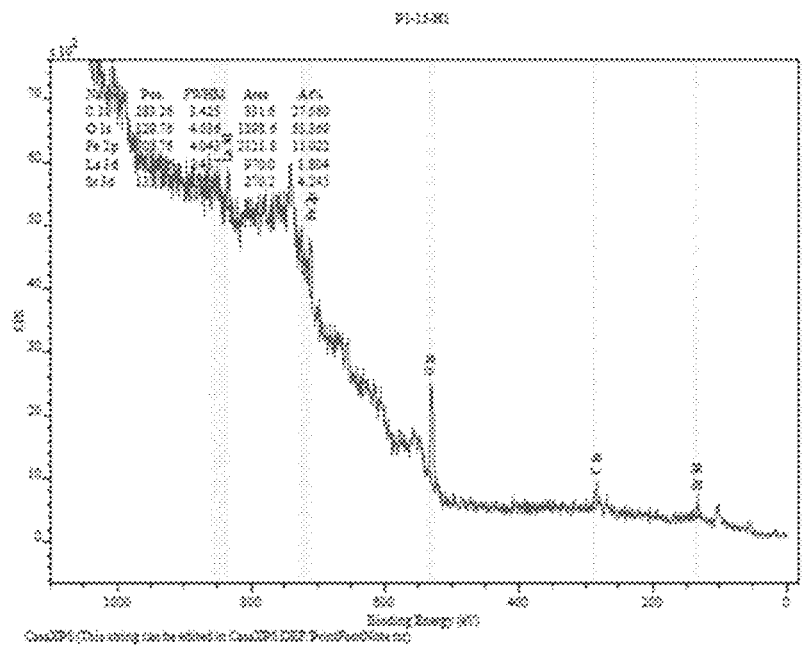
Figure 10B:
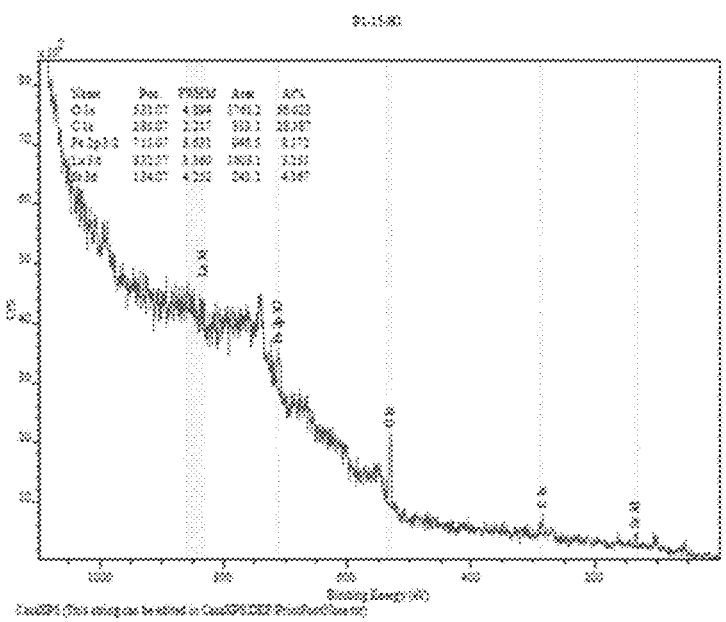
Figure 11:
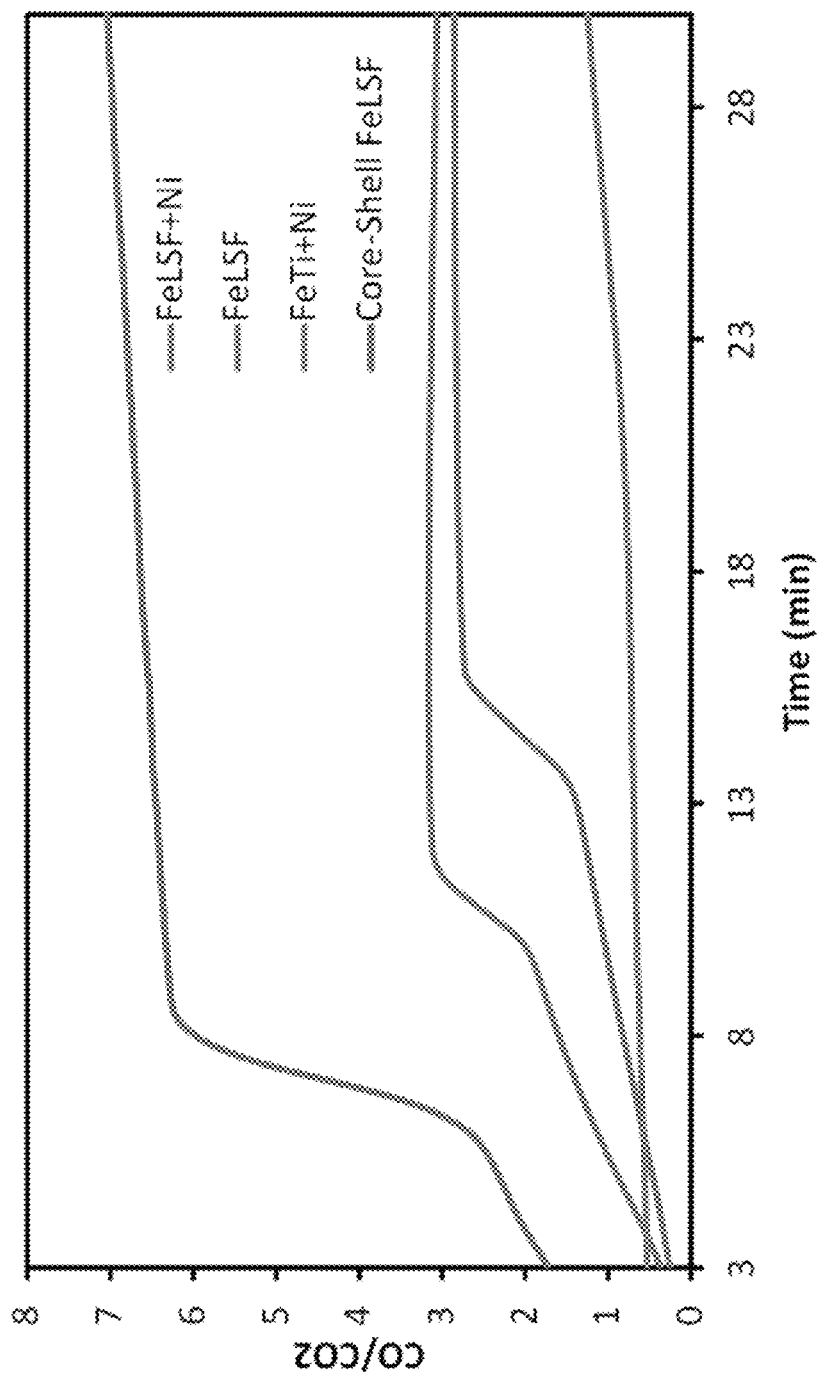

Having thus described the presently disclosed subject matter in general terms, reference will now be made to the accompanying Figures, which are not necessarily drawn to scale, and wherein:

FIGS. 1a and 1b show a schematic diagram of: (a) the Redox Catalyst (RC) in the tar removal step; and (b) the tar removal scheme, which involves cyclic reduction-regeneration of the RC;

FIGS. 2a and 2b show a schematic illustration of: (a) the core-shell redox catalyst (RC) comprising: (i) transition metal oxide core; (ii) mixed-conductive shell; (iii) surface catalytic sites; and (b) the proposed methane ($CH_4$) reforming scheme;

FIG. 3 shows a simplified schematic of the redox reactions of perovskite supported iron oxide composites (other mixed ionic-electronic conductive (MIEC) supports having a structure different from perovskite also can be used);

FIG. 4 shows reactivity comparisons among various composite iron oxides. FeLSF refers to LSF-1 and Sol-Gel refers to LSF-CS-2 in Table 1;

FIG. 5 shows the effect of a perovskite support on the reactivity of composite oxides;

FIGS. 6a, 6b, and 6c show the recyclability and phase stability of the composite oxygen carrier;

FIGS. 7a, 7b, and 7c show the physical stability of the CTF oxygen carrier. FIG. 7a (fresh pellet), FIG. 7b (post 100 cycles at 900° C.), FIG. 7c (center pellet after 100 addition redox cycles at 1,100° C. pellet);

FIGS. 8a and 8b show the physical stability of the $Fe_2O_3$@LSF nano-particle. FIG. 8a (fresh particle), FIG. 8b (post 10 cycles at 900° C.);

FIGS. 9a, 9b, 9c, 9d, and 9e show a transmission electron microscopy (TEM) image and energy-filtered transmission electron microscopy (EFTEM) elemental mapping of LSF-SG-1;

FIGS. 10a and 10b show the structural/compositional stabilities of LSF-SG-1; and FIG. 11 shows the superior selectivity of the core-shell redox catalyst toward CO generation.

DETAILED DESCRIPTION

The presently disclosed subject matter now will be described more fully hereinafter with reference to the accompanying Figures, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

I. Mixed-Conductor Enhanced Composite and Core-Shell Oxides for Cyclic Redox Production of Fuels and Chemicals The presently disclosed subject matter is generally directed to ceramic mixed ionic-electronic conductor (MIEC) enhanced transition metals and metal oxides in either composite or core-shell forms. The presently disclosed mixed-conductor enhanced metal oxides exhibit structural and chemical stability, tunable thermodynamic properties, superior redox activity, and/or product selectivity.

The presently disclosed subject matter further provides a strategy for designing and optimizing oxygen carriers and redox catalysts. In some embodiments, the strategy includes activity enhancement via a composite of primary (transition) metal oxide and a mixed-conductive "support." In other embodiments, the strategy includes formation of a primary metal oxide@mixed-conductive oxide core-shell structure.

A. Primary Metal Oxide-Mixed Ionic-Electronic Conductive (MIEC) Composite

In some embodiments, the presently disclosed subject matter provides a redox catalyst comprising an oxygen carrying material, a mixed ionic-electronic conductive (MIEC) support, and a catalytically-active surface. In certain embodiments, the oxygen carrying material comprises a metal oxide. In particular embodiments, the metal oxide comprises a transition metal oxide and mixtures thereof. In some embodiments, the transition metal oxide comprises an oxide of a transition metal selected from the group consisting of Mn, Fe, Co, Ni, V, Mo, Cu, Zn, Si and mixtures thereof.

In other embodiments, the metal oxide comprises a spinel oxide having a formula $A^{2+}B_2^{3+}O_4^{2-}$, wherein A and B are each independently a metal cation. In such embodiments, the metal cation is selected from the group consisting of magnesium, calcium, strontium, barium, zinc, iron, manganese, aluminum, chromium, titanium, and silicon.

In yet other embodiments, the MIEC support has a perovskite structure. In particular embodiments, the MIEC support is selected from the group consisting off $La_xSr_{1-x}FeO_3$, $BaCe_yFe_{1-y}O_3$, $CaTi_zFe_{1-z}O_3$ ($0.2<x<0.8$, $0.2<y<0.8$, $0.05<z<0.75$). In yet more particular embodiments, the redox catalyst comprises a metal oxide-MIEC composite selected from the group consisting of between 20%-80% $Fe_2O_3$, 20%-80% $La_{0.7}Sr_{0.3}FeO_3$; 20%-80% $Fe_2O_3$, 20%-80% $BaCe_{0.7}Fe_{0.3}O_3$; and 20%-80% $Fe_2O_3$, 20%-80% $CaTi_{0.85}Fe_{0.15}O_3$, wherein 20%-80% includes 20%, 25%, 30%, 35%, 40%, 45%, 50%, 55%, 60%, 65%, 70%, 75%, and 80%, and any integer or fractional integer in between. In even yet more particular embodiments, the redox catalyst comprises a metal oxide-MIEC composite selected from the group consisting of 50% $Fe_2O_3$, 50% $La_{0.7}Sr_{0.3}FeO_3$; 50% $Fe_2O_3$, 50% $BaCe_{0.7}Fe_{0.3}O_3$; and 50% $Fe_2O_3$, 50% $CaTi_{0.85}Fe_{0.15}O_3$.

In some embodiments, the redox catalyst is prepared by a method selected from the group consisting of a solid state reaction (SSR) and a sol-gel method.

A number of primary oxide and MIEC materials can be used to synthesize the presently disclosed oxygen carriers and redox catalysts. For example, a primary oxide comprising at least one of Fe, Mn, Co, Cu, Ni, V, Mo, Bi, Zn, Si and mixtures thereof (e.g., Fe—Mn, Fe—Co, Ni—Fe, Cu—Fe) can be used. Further, spinel oxides comprising Fe, Ni, Cu, Co, Al, and Mg, also can be used as the primary oxide.

Spinel oxides are a class of minerals of the general formula $A^{2+}B_2^{3+}O_4^{2-}$ which crystallize in the cubic (isometric) crystal system, with the oxide anions arranged in a cubic close-packed lattice and the cations A and B occupying some or all of the octahedral and tetrahedral sites in the lattice. A and B can be divalent, trivalent, or quadrivalent cations, including magnesium, zinc, iron, manganese, aluminum, chromium, titanium, and silicon. Although the anion is normally oxide, the analogous thiospinel structure, where the oxygen atom is replaced with a sulfur atom also is included in the spinel minerals. A and B also can be the same metal under different charges, such as the case in magnetite, $Fe_3O_4$ (as $Fe^{2+}Fe_2^{3+}O_4^{2-}$).

Members of the spinel group include, but are not limited to, aluminum spinels, such as spinel ($MgAl_2O_4$), gahnite ($ZnAl_2O_4$), and hercynite ($FeAl_2O_4$); iron spinels, such as cuprospinel ($CuFe_2O_4$), franklinite (($Fe,Mn,Zn$)($Fe,Mn$)$_2O_4$), jacobsite ($MnFe_2O_4$), hercynite ($Fe^{+2}Al_2O_4$), magnesioferrite, ($MgFe_2^{+3}O_4$), magnetite ($Fe_3O_4$), greigite ($Fe_3S_4$), trevorite ($NiFe_2O_4$), ulvöspinel ($TiFe_2O_4$), and zinc ferrite (($Zn, Fe$) $Fe_2O_4$); chromium spinels, such as chromite ($FeCr_2O_4$) and magnesiochromite ($MgCr_2O_4$); and other compounds having a spinel structure, such as ringwoodite (($Mg,Fe$)$_2SiO_4$), and the thiospinels and selenospinels, which can be synthesized, or in some instances occur in nature.

More particularly, in some embodiments, the MIEC support can have one of the following structures: perovskite, fluorite, $La_2Cu_{1-x}Co_xO_{4-\delta}$, and $K_2NiF_4$-type structures. Generally, a perovskite structure includes any material with the same type of crystal structure as calcium titanium oxide ($CaTiO_3$), which also is referred to as the "perovskite structure" and is denoted $A^{2/3+}B^{3/4+}X^{2-}_3$ with the $X^{2-}$ atom, e.g., $O^{2-}$, in the face centers. The general chemical formula for perovskite compounds is $ABX_3$, where 'A' and 'B' are two cations of different sizes, and X is an anion that bonds to both. The 'A' atoms typically are larger than the 'B' atoms.

The perovskite structure is adopted by many oxides that have the chemical formula $ABO_3$. In a perovskite structure, the ideal cubic-symmetry structure has the B cation in 6-fold coordination, surrounded by an octahedron of anions and the A cation in 12-fold cuboctahedral coordination. Naturally occurring compounds having this structure include perovskite, loparite (($Ce,Na,Ca$)($Ti,Nb$)$O_3$), and the silicate perovskites, e.g., ($Mg,Fe$)$SiO_3$ and $CaSiO_3$.

In particular embodiments, with regard to the perovskite structure, a general formula of $A_xA'_{1-x}B_yB'_{1-y}O_{3-\delta}$ is preferred. In general, both x and y vary between 0-1. A and A' can be selected from alkali earth, alkali, and/or rare earth group metals. Preferred A/A' metals include Ca, Ba, Sr, La, Pr, Sm, K, Na, and Li. B and B' can be selected from alkali earth and transition metals. Preferred B/B' metals include Ti, Fe, Mn, Co, Ni, Cu, Mg, Zr, Ce, Bi, V, Mo, W, Pt, Pd, Ru, Zn, and Rh. Redox performances of several preferred configurations of the redox catalysts/oxygen carriers are given herein below.

In particular embodiments, perovskite having a general formula of $A_xA'_{1-x}B_yB'_{1-y}O_{3-\delta}$ can act as a standalone oxygen carrier and catalyst for redox applications. Preferred A/A' metals include Ca, Ba, Sr, La, and preferred B/B' metals include Ti, Fe, Ni, Mn, and Ce.

B. Primary Metal Oxide@Mixed-Conductive Oxide Core-Shell Structure

In some embodiments, the presently disclosed subject matter provides a core-shell redox catalyst comprising: (i) metal oxide core; (ii) a mixed ionic-electronic conductive (MIEC) shell; and (iii) a plurality of surface catalytic sites. In certain embodiments, the metal oxide core comprises a transition metal oxide and mixtures thereof. In some embodiments, the transition metal oxide comprises an oxide of a transition metal selected from the group consisting of Mn, Fe, Co, Ni, V, Mo, Cu, Zn, and mixtures thereof.

In other embodiments, the metal oxide comprises a spinel oxide having a formula $A^{2+}B_2^{3+}O_4^{2-}$, wherein A and B are each independently a metal cation. In such embodiments, the metal cation is selected from the group consisting of magnesium, zinc, iron, manganese, aluminum, chromium, titanium, and silicon.

In yet other embodiments, the MIEC shell has a perovskite structure. In particular embodiments, the MIEC shell is selected from the group consisting of In particular embodiments, the MIEC support is selected from the group consisting of $La_xSr_{1-x}FeO_3$, $BaCe_yFe_{1-y}O_3$, $CaTi_zFe_{1-z}O_3$ ($0.2<x<0.8$, $0.2<y<0.8$, $0.05<z<0.75$). In yet more particular embodiments, the redox catalyst comprises a metal oxide-MIEC composite selected from the group consisting of between 20%-80% $Fe_2O_3$, 20%-80% $La_{0.7}Sr_{0.3}FeO_3$; 20%-80% $Fe_2O_3$, 20%-80% $BaCe_{0.7}Fe_{0.3}O_3$; and 20%-80% $Fe_2O_3$, 20%-80% $CaTi_{0.85}Fe_{0.15}O_3$, wherein 20%-80% includes 20%, 25%, 30%, 35%, 40%, 45%, 50%, 55%, 60%, 65%, 70%, 75%, and 80%, and any integer or fractional integer in between. In even yet more particular embodiments, the redox catalyst comprises a metal oxide-MIEC composite selected from the group consisting of 50% $Fe_2O_3$, 50% $La_{0.7}Sr_{0.3}FeO_3$; 50% $Fe_2O_3$, 50% $BaCe_{0.7}Fe_{0.3}O_3$; and 50% $Fe_2O_3$, 50% $CaTi_{0.85}Fe_{0.15}O_3$.

In some embodiments, the redox catalyst is prepared by a method selected from the group consisting of a solid state reaction (SSR) and a sol-gel method. In further embodiments, the core-shell redox catalyst further comprises an active metal.

C. Applications of the Presently Disclosed Redox Catalysts

The presently disclosed oxides can be generally used for cyclic redox conversion of commodity fuels, such as natural gas, coal, biomass, and the like, into value-added, environmentally friendly products, such as hydrogen, synthesis gas, electricity, and other chemicals or fuels.

i. Conversion of Biomass Tar

In some embodiments, the presently disclosed methods include a strategy to convert biomass tar (FIGS. 1a and 1b). In representative embodiments as depicted in FIGS. 1a and 1b, the presently disclosed redox catalyst for use in tar conversion combines three components: (i) an oxygen carrying material (primary metal oxide) for lattice oxygen ($O^{2-}$) storage; (ii) a mixed ionic-electronic conductive (MIEC) "support" which facilities $O^{2-}$ and electron/hole conduction; and (iii) a catalytically active surface for tar conversion.

To participate in tar oxidation reactions, $O^{2-}$ is shuttled from the primary oxide to the catalyst surface via the MIEC support. As used herein, MIEC supports are materials that conduct both ions ($\sigma_i$) and electronic ($\sigma_{el}$) charge carriers (electrons and/or holes). MIECs typically refer to those materials in which $\sigma_i$ and $\sigma_{el}$ do not differ by more than two orders of magnitude. MIECs also can refer to materials in which $\sigma_i$ and $\sigma_{el}$ are not too low ($\sigma_i$, $\sigma_{el} \geq 10^{-5}$ Scm$^{-1}$).

MIECs also can include materials that conduct matter (ions and/or atoms) and electronic charge carriers, which includes ionic and metallic bonding in solids and a variety of structures including, but not limited to, a crystalline structure, glasses, and polymers.

In the tar oxidation reactions, the electrons released by $O^{2-}$ on the catalyst surface are conducted back to the primary oxide to maintain charge balance and to facilitate primary oxide reduction. In a subsequent regeneration step, oxygen consumed in the tar removal step is replenished by air/$H_2O$ (FIG. 1b). Each redox catalyst particle can be considered as a large collection of MIEC membrane reactors at a nanoscale. Compared to conventional membrane reactors, the presently disclosed mixed ionic-electronic conductive (MIEC)-primary oxide composite redox catalyst can be more robust and flexible, since a dense membrane layer is unnecessary.

Without wishing to be bound to any one particular theory, it is believed that since the primary oxide is surrounded by MIEC on a nanoscale, all $O^{2-}$ stored in the primary oxide is accessible to the redox reactions. The embedded $O^{2-}$ can improve the catalyst activity. Moreover, coke formation, a major contributor to tar removal catalyst deactivation, is not thermodynamically favored on the presently disclosed redox catalyst due to its active lattice oxygen. The same concept can be used to prepare composite oxygen carriers for CLG and CLC.

Accordingly, in some embodiments, the presently disclosed subject matter provides a method for converting biomass to syngas, the method comprising: (a) gasifying the biomass to produce a raw syngas comprising CO, $H_2$, and biomass tar of the formula $C_xH_y$; (b) contacting the raw syngas with a redox catalyst comprising one of: (i) an oxygen carrying material, a mixed ionic-electronic conductive (MIEC) support, and a catalytically-active surface; (ii) a metal oxide core; a mixed ionic-electronic conductive (MIEC) shell; and a plurality of surface catalytic sites; and (iii) a mixed conductive catalyst having a perovskite structure and a general formula of $A_xA'_{1-x}B_yB'_{1-y}O_{3-\delta}$, wherein A/A' metals are selected from the group consisting of Ca, Ba, Sr, and La, and B/B' metals are selected from the group consisting of Ti, Fe, Ni, Mn, and Ce; thereby reducing the redox catalyst and converting the biomass tar of formula $C_xH_y$ to xCO and y$H_2$; and (c) contacting the reduced redox catalyst with $H_2O$/$O_2$ to regenerate the redox catalyst and to produce $H_2$ and/or heat.

ii. Conversion of Methane into Syngas

In other embodiments, the presently disclosed subject matter provides a strategy to convert methane into syngas, a fuel gas mixture consisting primarily of hydrogen, carbon monoxide, and also, in some cases, carbon dioxide (FIGS. 2a and 2b).

In representative embodiments as depicted in FIGS. 2a and 2b, the presently disclosed redox catalyst combines three components: (i) an oxygen carrying core (primary metal oxide) for lattice oxygen ($O^{2-}$) storage; (ii) a mixed ionic-electronic conductive (MIEC) shell, which facilitates $O^{2-}$ and electron/hole conduction and serves as the catalyst substrate; and (iii) an (optional) active metal for methane reforming. To participate in reforming reactions, $O^{2-}$ is shuttled from the primary oxide to the catalyst surface by the MIEC shell. Meanwhile, the electrons released by $O^{2-}$ on the surface are conducted back to the primary oxide to maintain charge balance and to facilitate primary oxide reduction. In a subsequent regeneration step, oxygen consumed for methane oxidation is replenished by air (FIG. 1b).

Under such an arrangement, each core-shell redox catalyst particle can be considered as a nano-scale MIEC membrane reactor. Compared to conventional membrane reactors, the presently disclosed core-shell redox catalyst can be more robust and flexible since the functionality of the redox catalyst does not rely on large, defect-free membrane layers. Enclosed by a rigid, stable MIEC shell, the redox catalyst will be highly resistant toward sintering.

Moreover, the MIEC shell allows full accessibility of the ample active $O^{2-}$ stored at the nano-scale primary oxide core (up to 20 wt % oxygen storage). The embedded, active $O^{2-}$ can improve the reforming activity of the catalyst. Moreover, it can inhibit carbon formation and sulfur poisoning of the redox catalyst thermodynamically, making the catalyst less susceptible to deactivation. Methane partial oxidation enabled by the redox catalyst also produces a syngas stream with a $H_2$:CO molar ratio of approximately 2:1, which is ideal for liquid fuel synthesis via the Fischer-Tropsch process.

Accordingly, in some embodiments, the presently disclosed subject matter provides a method for generating syngas from methane, the method comprising: (a) contacting methane or light hydrocarbons with a redox catalyst comprising: (i) an oxygen carrying material, a mixed ionic-electronic conductive (MIEC) support, and a catalytically-active surface; (ii) a metal oxide core; a mixed ionic-electronic conductive (MIEC) shell; and a plurality of surface catalytic sites; and (iii) a mixed conductive catalyst with a perovskite structure and a general formula of $A_xA'_{1-x}B_yB'_{1-y}O_{3-\delta}$, wherein A/A' metals are selected from the group consisting of Ca, Ba, Sr, and La, and B/B' metals are selected from the group consisting of Ti, Fe, Ni, Mn, and Ce; thereby reducing the redox catalyst and converting the methane or light hydrocarbons, thereby reducing the redox catalyst and producing CO and $H_2$; and (b) contacting the reduced redox catalyst with $H_2O/O_2$ to regenerate the redox catalyst and to produce $H_2$ and/or heat.

iii. Oxidation of Syngas into Carbon Dioxide and Splitting of Water to Form Hydrogen Referring now to FIG. 3, another representative example for developing a presently disclosed composite oxygen carrier is provided, where catalyst modification to the surface is not performed. The process involves complete oxidation of a fuel to generate carbon dioxide. The reduced metal oxide is then regenerated with air to produce heat. It also can be used to split water, making hydrogen.

Although specific terms are employed herein, they are used in a generic and descriptive sense only and not for purposes of limitation. Unless otherwise defined, all technical and scientific terms used herein have the same meaning as commonly understood by one of ordinary skill in the art to which this presently described subject matter belongs.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Preparation of the Presently Disclosed Composites

To evaluate the performance of the MIEC-primary oxide composite, eleven perovskites and perovskite-supported ferrites were prepared. The nominal compositions of these single-phase and composite oxides are summarized in Table 1. $Fe_2O_3$-LSF (LaSrFe) composites were investigated, since previous studies had confirmed high redox activity of a similar oxygen carrying material. BaCeFe (BCF) and CaTiFe (CTF) perovskites were selected due to their varying ionic and electronic conductivities. Both solid state reaction (SSR) and sol-gel methods were used to synthesize the oxides. Both methods allow the formation of a mixed matrix between the (primary) iron oxide and perovskite support.

To investigate the effect of iron oxide particle sizes, a composite sample (CTF-2) can be prepared using larger precursor particles, i.e., between 38 μm and 53 μm $Fe_2O_3$ and CTF perovskite particles.

TABLE 1

Summary of the Mixed and Composite Oxides Prepared.

| Sample No. | Composition (wt %) |
|---|---|
| LSF-0 | 100% $La_{0.7}Sr_{0.3}FeO_3$ |
| BCF-0 | 100% $BaCe_{0.7}Fe_{0.3}O_3$ |
| CTF-0 | 100% $CaTi_{0.85}Fe_{0.15}O_3$ |
| CTF-SG-0 | 100% $CaTi_{0.85}Fe_{0.15}O_3$ |
| LSF-1 | 50% $Fe_2O_3$, 50% $La_{0.7}Sr_{0.3}FeO_3$ |
| BCF-1 | 50% $Fe_2O_3$, 50% $BaCe_{0.7}Fe_{0.3}O_3$ |
| CTF-1 | 50% $Fe_2O_3$, 50% $CaTi_{0.85}Fe_{0.15}O_3$ |
| CTF-2 | 50% $Fe_2O_3$, 50% $CaTi_{0.85}Fe_{0.15}O_3$ |
| CTF-SG-1 | 50% $Fe_2O_3$, 50% $CaTi_{0.85}Fe_{0.15}O_3$ |
| LSF-CS-1 | $Fe_2O_3$@LSF Core-Shell with Sol-Gel method |
| LSF-CS-2 | $Fe_2O_3$@LSF Core-Shell with hydrothermal method |

To synthesize pure perovskites via the SSR method, stoichiometric amounts of precursors were measured and mixed using a planetary ball-mill (XBM4X, Columbia International) for 6 hours with a rotation speed of 250 rpm. The homogeneous mixture was subsequently pelletized using a hydraulic press (YLJ-15T, MTI Corporation) under 15 MPa to 20 MPa and annealed in air at 1200° C. for 8 hours in a Tube Furnace (GSL-1500-X50, MTI Corporation). The calcined pellets were then crushed and sieved into particles of between 150 m to 250 nm for further characterization. A high calcination temperature was used to ensure adequate solid state reactions. The synthesis procedure for composite, perovskite supported ferrites is identical to that for single phase perovskites.

The sol-gel method also was used to synthesize CTF and CTF supported $Fe_2O_3$. To prepare single phase CTF, stoichiometric amounts of citric acid, EDTA, and $NH_3.H_2O$ were mixed to form a transparent solution. Calculated amounts of $Ca(NO_3)_2.4H_2O$ (Sigma Aldrich) and $Fe(NO_3)_3.9H_2O$ (Sigma Aldrich) were subsequently added to the citric-EDTA-$NH_3.H_2O$ solution under constant stirring at 50° C. to form solution "A". The ratio among citric acid:EDTA acid:total metal ions is 1.6:1.0:1.0, and the pH value was kept at 7-9. To introduce the titanium precursor, a stabilized titanium solution, comprising calculated amounts of tetrabutyl titanate, ethanol, acetic acid, and lactic acid, was introduced into the solution "A". The mixture was then heated to 80° C. and kept for 2 hours under stirring at 650 rpm to form a gel. The gel was then dried at 120° C. for 6 hours followed with calcination at 800° C. for 8 hours to obtain the CTF perovskite powder. The CTF supported $Fe_2O_3$ was prepared using a similar approach. The primary difference in this method was the addition of iron oxide in the form of $Fe_2O_3$ nanoparticles (Sigma Aldrich) into solution "A". This step allowed a separate hematite phase to be embedded into the CTF perovskite support.

Example 2

Characterization of the Presently Disclosed Composites

The performance of LSF-1 and LSF-SG-1 was compared with that of typical iron oxide based composites supported with alumina, spinel, and yttrium-stabilized-zicomia (FIG. 4). As shown in FIG. 4, the LSF-1 composite and LSF-SG-1 core-shell were two orders of magnitude more active than conventional supported oxygen carriers. In addition, they were more resistant toward coke formation. Comparing the reactivity among the three perovskite supported oxygen carriers, CTF-1 exhibited the highest activity (FIG. 5). FIGS. 6a-6c further exhibit the redox stability and phase stability of the CTF oxygen carriers. In addition to the formulation illustrated in Table 1, a wide variety of A/A', B/B' metal types and compositions listed hereinabove were investigated (data not shown). Most of the composites have been found to exhibit satisfactory activity and stability.

In addition to redox and phase stabilities, structural stability also is very important for redox materials. Both the core-shell structure and composite structure were found to enhance the mechanical/structural stability of the redox materials. FIGS. 7 and 8 illustrate the stability of the redox material after high temperature redox cycles. As can be seen from FIGS. 7a-7c, the redox material was stable even under an extremely high temperature of 1,100° C. In addition, FIGS. 8a-8b indicate the stability of individual $Fe_2O_3$@LSF core-shell nano-particles at 900° C. FIGS. 9a-9e illustrate the morphology of another type of $Fe_2O_3$@LSF core-shell nano-particles (LSF-SG-1). The structural stability of the nano-particles and their selectivity toward CO versus $CO_2$ is given in FIGS. 10a-b, 11, Table 2, and Table 3 below.

TABLE 2

Performances for methane partial oxidation among various synthesized composite and coreshell-LSF-$Fe_2O_3$ redox catalysts.

| | Perovskite:Iron Oxide (1:1) | | | | |
|---|---|---|---|---|---|
| Material | LSF:Fe/Prax | LSFPt:Fe/Prax | LSF Core Shell | LSF/Iron Composite | LSFPt Fe Core Shell |
| $H_2$ Selectivity | 60% | 100% | 100% | 72% | 74% |
| CO Selectivity | 87% | 89% | 88% | 83% | 83% |

TABLE 3

Elemental compositions of redox catalysts in fresh sample compared to after 100 cycle redox cycles

| | Bulk | Surface Atomic Composition (%) | |
|---|---|---|---|
| Element | Composition (%) | Fresh Sample | After 100 cycle redox cycles |
| O | 60 | 71.77 | 78.23 |
| Fe | 31.86 | 13.18 | 11.41 |
| La | 6.51 | 8.25 | 4.54 |
| Sr | 1.63 | 6.80 | 5.82 |

In summary, the strategies and compositions outlined in FIGS. 1-3 are proven to be highly stable and active for cyclic redox operations. The materials can also be tailored with high selectivity toward partial oxidation products. They can also carry more than 20 wt % lattice oxygen, making them ideal redox catalyst/oxygen carrier for a variety of applications. It also has been shown that a variety of mixed-oxides can be used as the primary oxide for the abovementioned applications with tunable redox properties.

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

EP 2640509 A2 for Catalyst for Hydrogen Production, to J. Alouisius and Z. Pieterse, published Sep. 25, 2013.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A core-shell redox catalyst comprising:
   (i) metal oxide core, wherein the metal oxide core comprises at least one transition metal oxide and mixtures thereof, wherein the at least one transition metal oxide is an oxide of a transition metal selected from the group consisting of Mn, Fe, Co, Ni, V, Mo, Cu, Zn and mixtures thereof, a spinel oxide having a formula $A^{2+}B_2^{3+}O_4^{2-}$, wherein A and B are each independently a metal cation, or combinations thereof:
   (ii) A rigid mixed ionic-electronic conductive (MIEC) shell substantially enclosing the metal oxide core, wherein the rigid MIEC shell comprises a perovskite structure; and
   (iii) A plurality of surface catalytic sites.

2. The core-shell redox catalyst of claim 1, wherein the metal cation is selected from the group consisting of magnesium, zinc, iron, manganese, aluminum, chromium, titanium, and silicon.

3. The core-shell redox catalyst of claim 1, wherein the rigid MIEC shell is selected from the group consisting of $La_xSr_{1-x}FeO_3$, $BaCe_yFe_{1-y}O_3$, and $CaTi_zFe_{1-z}O_3$, wherein $0.2<x<0.8$, $0.2<y<0.8$, and $0.05<z<0.75$.

4. The core-shell redox catalyst of claim 1, further comprising an active metal.

5. The core-shell redox catalyst of claim 1, wherein the core-shell redox catalyst has a lattice oxygen capacity of about 5 w.t. % to about 20 w.t. %.

6. The core-shell redox catalyst of claim 1, wherein the rigid MIEC shell is selected from the group consisting of $BaCe_yFe_{1-y}O_3$ and $CaTi_zFe_{1-z}O_3$, wherein $0.2<y<0.8$, and $0.05<z<0.75$.

7. The core-shell redox catalyst of claim 1, wherein the metal oxide core comprises an iron oxide;
   wherein the rigid MIEC shell comprises $La_xSr_{1-x}FeO_3$, wherein $0.2<x<0.8$;
   wherein a ratio of the metal oxide of the core to the MIEC shell is about 4:1 to about 1:4;
   wherein the core-shell redox catalyst has a lattice oxygen capacity of about 10 w.t. % to about 20 w.t. %; and
   wherein a surface area of the core-shell redox catalyst is about 15 $m^2 g^{-1}$ or less.

8. A method for generating syngas, the method comprising contacting methane, light hydrocarbons, or a mixture thereof with a redox catalyst according to claim 1, thereby reducing the redox catalyst to produce a reduced redox catalyst and converting the methane and/or light hydrocarbons into syngas.

9. The method of claim 8, further comprising contacting the reduced redox catalyst with $H_2O/O_2$ to regenerate the redox catalyst and to produce $H_2$ and/or heat.

* * * * *